United States Patent
Kasuga et al.

(10) Patent No.: US 7,232,779 B2
(45) Date of Patent: Jun. 19, 2007

(54) OPTICAL GLASS, PRECISION PRESS MOLDING PREFORM AND METHOD OF MANUFACTURING THE SAME, OPTICAL ELEMENT AND METHOD OF MANUFACTURING THE SAME

(75) Inventors: Yoshiko Kasuga, Koganei (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 337 days.

(21) Appl. No.: 10/643,991

(22) Filed: Aug. 20, 2003

(65) Prior Publication Data

US 2004/0106507 A1 Jun. 3, 2004

(30) Foreign Application Priority Data

Aug. 20, 2002 (JP) ............... 2002-238909

(51) Int. Cl.
*C03C 3/066* (2006.01)
*C03C 3/155* (2006.01)

(52) U.S. Cl. .......................... 501/79; 501/51
(58) Field of Classification Search ................. 501/51, 501/79
See application file for complete search history.

(56) References Cited

U.S. PATENT DOCUMENTS

| | | | | |
|---|---|---|---|---|
| 6,413,894 | B1 * | 7/2002 | Sato ............................ | 501/77 |
| 6,645,894 | B2 * | 11/2003 | Endo ........................... | 501/51 |
| 6,797,659 | B2 * | 9/2004 | Uehara ........................ | 501/78 |
| 6,844,279 | B2 * | 1/2005 | Hayashi et al. ............... | 501/50 |
| 2003/0022782 | A1 * | 1/2003 | Uehara ........................ | 501/78 |
| 2003/0032542 | A1 * | 2/2003 | Endo ........................... | 501/50 |
| 2003/0040422 | A1 * | 2/2003 | Kikuchi et al. ............... | 501/52 |
| 2003/0050177 | A1 * | 3/2003 | Uehara ........................ | 501/78 |
| 2003/0125186 | A1 * | 7/2003 | Hayashi et al. ............... | 501/50 |
| 2003/0211929 | A1 * | 11/2003 | Hayashi et al. ............... | 501/78 |
| 2004/0186003 | A1 * | 9/2004 | Uehara ........................ | 501/78 |
| 2005/0113240 | A1 * | 5/2005 | Hayashi et al. ............... | 501/50 |

FOREIGN PATENT DOCUMENTS

| | | |
|---|---|---|
| JP | 60-221338 A | 11/1985 |
| JP | 62-100449 A | 5/1987 |
| JP | 06-122526 A | 5/1994 |
| JP | 6-305769 | 11/1994 |
| JP | 11-268918 A | 10/1999 |
| JP | 2002-12443 | 1/2002 |

* cited by examiner

*Primary Examiner*—J. A. Lorengo
*Assistant Examiner*—Elizabeth A. Bolden
(74) *Attorney, Agent, or Firm*—Sughrue Mion, PLLC

(57) ABSTRACT

Provided are optical glass exhibiting a refractive index (nd) in a range of 1.75 to 1.87, an Abbé number (vd) in a range of 80 to 45, and excellent low-temperature softening properties even when not incorporating $Th_2O_5$ as well as permitting a low production cost; a precision press molding preform and an optical element comprised of such glass; a method of manufacturing the preform; and a method of manufacturing the optical element. The optical glass comprises, in a molar percent, 30 to 45 percent of $B_2O_3$, 2 to 15 percent of $SiO_2$, 10 to 20 percent of $La_2O_3$, 1 to 10 percent of $TiO_2$, 10 to 30 percent of ZnO, 2 to 15 percent of $Li_2O$, higher than 0 percent and 10 percent or less of $WO_3$, 0 to 15 percent of $Nb_2O_5$, and 0 to 10 percent of $ZrO_2$, wherein the total amount of the above-mentioned components is higher than 95 percent, the glass exhibits a refractive index (nd) in a range of 1.75 to 1.87, and an Abbé number (vd) in a range of 80 to 45. The precision press molding preform and the optical element are comprised of the glass. In the method of manufacturing a precision press molding preform, the preform comprised of the optical glass is formed. The method of manufacturing an optical element employs the precision press molding preform.

27 Claims, 2 Drawing Sheets

OPTICAL GLASS, PRECISION PRESS MOLDING PREFORM AND METHOD OF MANUFACTURING THE SAME, OPTICAL ELEMENT AND METHOD OF MANUFACTURING THE SAME

FIELD OF THE INVENTION

The present invention relates to optical glass having good optical characteristics and properties capable of being softened at lower temperatures, hereinafter referred to "low-temperature softening properties", a precision press molding preform, a method of manufacturing the same, an optical element, and a method of manufacturing the same.

BACKGROUND OF THE INVENTION

Precision press molding is a known method of molding optical products such as lenses to high precision shapes and dimensions with good production properties. When the temperature used to mold the glass employed in precision presses reaches high temperature of 600° C. or more, there are problems in that the surface of the pressing mold is damaged and the durability of the mold material decreases. Thus, the transition temperature of the glass must be lower than 600° C. However, commercially available optical glass, with optical characteristics of a refractive index (nd) of around 1.8 and an Abbé number (vd) of about 30 to 45, has a high glass transition temperature (Tg) of 600° C. or more and is thus not suited to precision press molding.

To solve this problem, glass incorporating a large amount of an alkali such as $Li_2O$ has been proposed. One example is the $SiO_2$—$B_2O_3$—$La_2O_3$—$Ta_2O_5$—$ZnO$—$Li_2O$ glass described in Japanese Unexamined Patent Publication (KO-KAI) Heissi No. 6-305769. The glass described in the above-mentioned publication incorporates a large quantity of $Ta_2O_5$ as an essential component for reducing the glass transition temperature. However, $Ta_2O_5$, that is basically a scarce material to begin with, has in recent years been in great demand as a capacitor material causing the cost to skyrocket. Thus, it has become difficult to provide glass employing large amounts of $Ta_2O_5$ at low cost, or to produce such glass in large amounts.

The present invention was devised to solve the above-stated problems. It is an object of the present invention to provide optical glass having a refractive index (nd) of 1.75 to 1.87, an Abbé number (vd) of 30 to 45, and excellent low-temperature softening properties even when not incorporating $Ta_2O_5$ as well as permitting a low production cost; a precision press molding preform and an optical element comprised of such glass; a method of manufacturing the preform; and a method of manufacturing the optical element.

SUMMARY OF THE INVENTION

In order to achieve low cost in combination with optical characteristics and a low-temperature softening property, the present inventors conducted extensive research to obtain optical glass exhibiting good optical characteristics and low-temperature softening properties without the incorporation of $Ta_2O_5$. As a result, they discovered that optical glass with low-temperature softening properties and good optical characteristics could be obtained in the following glass without the incorporation of $Ta_2O_5$; the present invention was devised on that basis.

The first aspect of the present invention is optical glass comprising, in a molar percent,
30 to 45 percent of $B_2O_3$,
2 to 15 percent of $SiO_2$,
10 to 20 percent of $La_2O_3$,
1 to 10 percent of $TiO_2$,
10 to 30 percent of $ZnO$,
2 to 15 percent of $Li_2O$,
higher than 0 percent and 10 percent or less of $WO_3$,
0 to 15 percent of $Nb_2O_5$, and
0 to 10 percent of $ZrO_2$,
wherein the total amount of the $B_2O_3$, $SiO_2$, $La_2O_3$, $TiO_2$, $ZnO$, $Li_2O$, $WO_3$, $Nb_2O_5$ and $ZrO_2$ is higher than 95 percent, and the glass exhibits a refractive index (nd) in a range of 1.75 to 1.87 and an Abbé number (vd) in a range of from 30 to 45.

The optical glass of the first aspect is also such glass that exhibits a glass transition temperature (Tg) of 580° C. or less, as well as exhibits properties, based on a thickness of 10 mm, in the spectral transmittance of wavelengths of 280 to 700 nm, that the wavelength, at which a 80 percent spectral transmittance is exhibited, is 440 nm or less, and the wavelength, at which a 5 percent spectral transmittance is exhibited, is 350 nm or less.

The second aspect of the present invention is optical glass comprising essential components of $B_2O_3$, $SiO_2$, $La_2O_3$, $TiO_2$, $ZnO$, $Li_2O$, and $WO_3$ and optional components of $Nb_2O_5$ and $ZrO_2$,
wherein the total amount of the $B_2O_3$, $SiO_2$, $La_2O_3$, $TiO_2$, $ZnO$, $Li_2O$, $WO_3$, $Nb_2O_5$ and $ZrO_2$ is higher than 95 molar percent,
the glass exhibits a refractive index (nd) in a range of 1.75 to 1.87, and an Abbé number (vd) in a range of 30 to 45,
the glass exhibits properties, based on a thickness of 10 mm, in the spectral transmittance of wavelengths of 280 to 700 nm, that the wavelength, at which a 80 percent spectral transmittance is exhibited, is 440 nm or less, and the wavelength, at which a 5 percent spectral transmittance is exhibited, is 350 nm or less, and
the glass exhibits a glass transition temperature (Tg) of 580° C. or less.

The specific gravity of the optical glass of the first and second aspects of the present invention is desirably 4.7 or less.

The present invention further relates to the following aspects:

(1) a precision press molding preform comprised of the optical glass of the first or second aspect;

(2) the precision press molding preform described in (1) wherein the entire surface is of the preform has been formed by solidifying melting glass as it is;

(3) the precision press molding preform described in (1) or (2) wherein the entire surface of the preform is comprised of a free surface;

(4) a method of manufacturing a precision press molding preform, wherein a prescribed weight of melting glass is separated from a melting glass flow flowing out from an outflow pipe to form a precision press molding preform comprised of the optical glass of the first or second aspect;

(5) an optical element comprised of the optical glass of the first or second aspect;

(6) an optical element obtained by precision press molding the precision press molding preform according to any of (1) to (3) or a preform formed by the method of manufacturing according to (4);

(7) A method of manufacturing an optical element in which a precision press molding preform is heated, softened and precision press molded to form a glass optical element, wherein the precision press molding preform according to any of (1) to (3) or a preform formed by the method of manufacturing according to (4) is employed as the preform;

(8) The method of manufacturing an optical element according to (7), wherein the heating of the precision press molding preform is conducted by introducing the precision press molding preform into a pressing mold and then heating the preform together with the pressing mold;

(9) The method of manufacturing an optical element according to (8), wherein said precision press molding preform is preheated prior to being introduced into the pressing mold.

Figure 1:
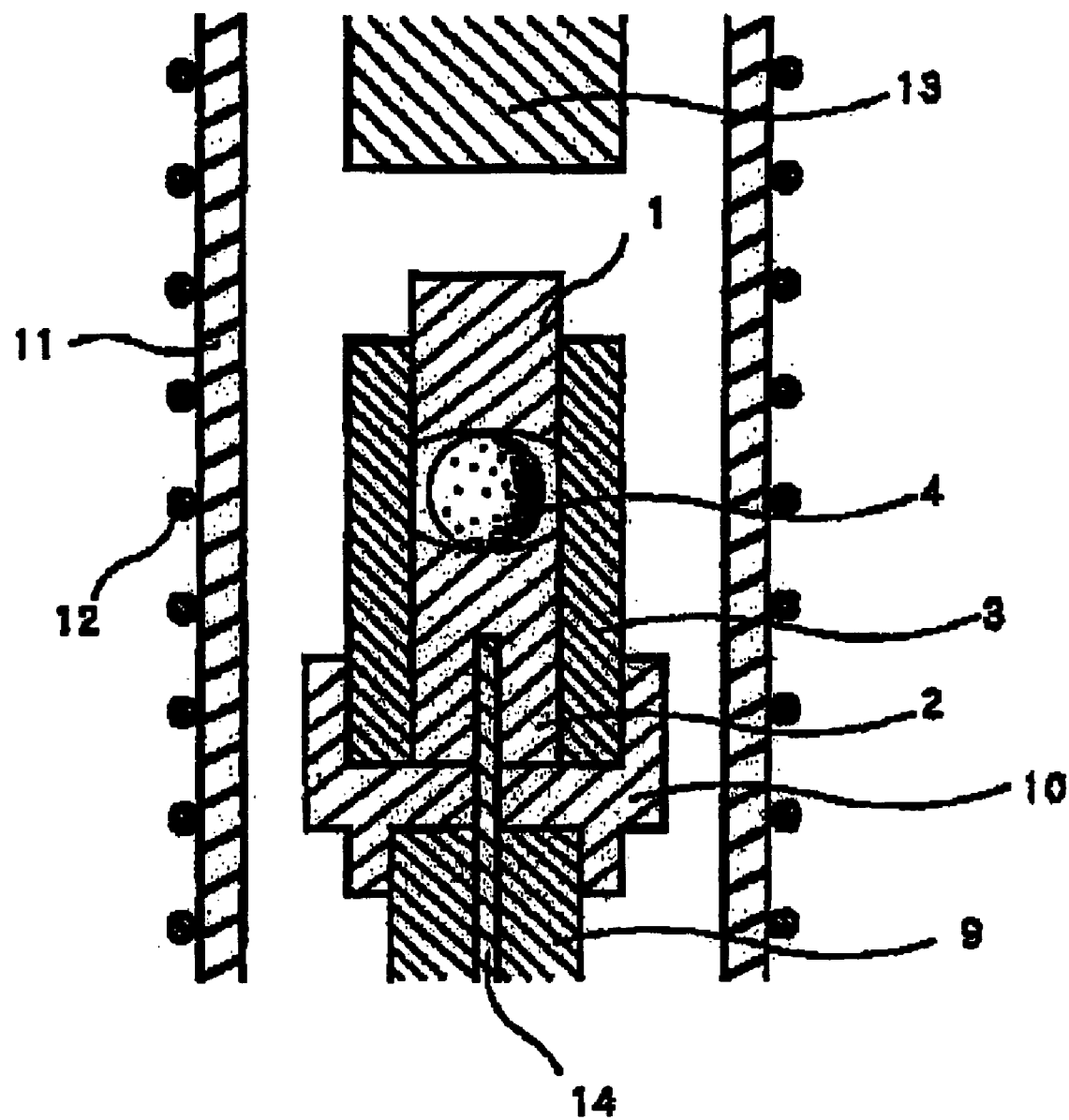
FIG. 1 is a cross-sectional descriptive view of a precision pressing device.

The present invention will be described in greater detail below.

(First Aspect)

The first aspect of the present invention is optical glass comprising, in a molar percent, 30 to 45 percent of $B_2O_3$,
2 to 15 percent of $SiO_2$,
10 to 20 percent of $La_2O_3$,
1 to 10 percent of $TiO_2$,
10 to 30 percent of ZnO,
2 to 16 percent of $Li_2O$,
higher than 0 percent and 10 percent or less of $WO_3$,
0 to 15 percent of $Nb_2O_5$, and
0 to 10 percent of $ZrO_2$, wherein the total amount of the $B_2O_3$, $SiO_2$, $La_2O_3$, $TiO_2$, ZnO, $Li_2O$, $WO_3$, $Nb_2O_5$ and $ZrO_2$ is higher than 95 percent, and the glass exhibits a refractive index (nd) in a range of from 1.76 to 1.87 and an Abbé number (vd) in a range of from 30 to 45.

The reasons for setting the above-stated ranges for individual components in the present aspect are as follows. The content of each component will be denoted as a molar percent not just in the present aspect, but throughout the description that follows.

$B_2O_3$ is a constituent component of the mesh structure of the glass, and is an essential component for imparting low-dispersibility to the glass and reducing its softening temperature. When the content is less than 30 percent, the glass transition temperature rises and it becomes impossible to maintain the desired optical constants. By contrast, when 45 percent is exceeded, there is a risk of deterioration in the durability and acid resistance of the glass. Thus, the content is limited to within a range of 30 to 45 percent, preferably within a range of 32 to 42 percent.

$SiO_2$ is a principal component constituting the mesh structure of the glass along with $B_2O_3$, and is an essential component for improving the durability of the glass. When the content is less than 2 percent, the resistance to devitrification of the glass deteriorates sharply, and when more than 15 percent is incorporated, it becomes impossible to maintain a low-temperature softening property and desired optical constants. Accordingly, the content is limited to within a range of 2 to 15 percent, preferably within a range of 3 to 12 percent.

$La_2O_3$ is an essential component for improving the durability and weatherability of the glass and imparting desired optical constants. However, when the content exceeds 20 percent, the refractive index of the glass exceeds the target range and there is a risk of deterioration of thermal resistance to devitrification; thus, the content must be kept to 20 percent or less. Conversely, at less than 10 percent, desired optical constants cannot be achieved. Thus, the content is limited to within a range of 10 to 20 percent, preferably within a range of 11 to 18 percent.

$TiO_2$ is a component that is introduced to adjust the optical constants of the glass, improve resistance to devitrification, and enhance chemical durability. When the content exceeds 10 percent, the Abbé number (vd) of the glass cannot be kept at 30 or higher, and resistance to devitrification deteriorates greatly; thus the content must be kept to 10 percent or less. Additionally, when the content is less than 1 percent, there is a tendency that the resistance to devitrification of the glass deteriorates greatly, the liquid phase temperature increases, and the production of preforms for press molding may be precluded. Thus, the content must be 1 percent or more, preferably falling within a range of 2 to 8 percent.

ZnO is an extremely important component for maintaining the low-temperature softening property and high weatherability of the glass. In particular, when a large quantity of ZnO is incorporated instead of the BaO that is often employed in conventional optical glass, the resistance to devitrification and weatherability of the glass improve substantially. In conventional glass having optical constants similar to the glass of the first aspect of the present invention, ZnO is employed as a component adjusting optical constants similar to BaO and CaO. By contrast, in the composition of the optical glass of the first aspect of the present invention, in comparison with other bivalent components, in addition to an effect of greatly raising the resistance to devitrification of the glass, ZnO is the best component for improving the low-temperature softening property and adjusting optical constants. When the ZnO content is less than 10 percent, it is impossible to maintain the targeted resistance to devitrification and low-temperature softening property, and when 30 percent is exceeded, the stability of the glass deteriorates and the liquid phase temperature increases sharply, creating the risk of impeding hot preform molding in the molding of preforms from melting glass. Accordingly, the content is limited to within a range of 10 to 30 percent, preferably from 10 to 25 percent, and more preferably to within a range of 12 to 22 percent.

$Li_2O$ is a component incorporated to improve the low-temperature softening property of the glass. When the content is less than 2 percent, the softening temperature rises and pressing becomes difficult. When 15 percent is exceeded, the liquid phase temperature of the glass rises sharply and weatherability deteriorates. Thus, the content is limited to the range of 2 to 15 percent, preferably to the range of 3 to 12 percent.

$WO_3$ has the effects of increasing the refractive index of the glass, inhibiting devitrification, and reducing the high-temperature viscosity of the melting glass. When $WO_3$ is not incorporated, it is difficult to stably manufacture glass, so it is an essential component in the present aspect. However, when 10 percent is exceeded, the tendency of the glass to develop coloration increases, so a content of 10 percent or less is desirable. Accordingly, the content is limited to higher than 0 percent but 10 percent or less, preferably falling within a range of 0.1 to 10 percent, more preferably a range of 0.5 to 8 percent.

$Nb_2O_5$ is extremely effective at raising the refractive index of the glass and improving the resistance to devitrification and chemical durability of the glass. When 15 percent is exceeded, the glass tends to devitrify. Accordingly, the content is limited to within a range of 0 to 15 percent. To achieve the above-described effects, a content of 2 to 15 percent is preferable, and 2 to 10 percent is more preferable.

$ZrO_2$ is an optional component employed to improve the weatherability and resistance to devitrification of the glass and adjust optical constants. In particular, the incorporation of a small quantity of $ZrO_2$ into the glass greatly improves the weatherability of the glass and helps lowering of the liquid phase temperature essential to hot preform molding. Thus, the incorporation of a small quantity of $ZrO_2$ is desirable. However, when the content exceeds 10 percent, it becomes difficult to achieve the desired optical constants and the low-temperature softening property deteriorates. Thus, the content is limited to within a range of 0 to 10 percent, preferably 0 to 8 percent, and more preferably 1 to 8 percent.

The incorporation of the above-described optional component $Nb_2O_5$ or $ZrO_2$ is preferable, and the incorporation of both $Nb_2O_5$ and $ZrO_2$ is more preferable. In particular, the content desirably falls within a range of 0 percent<$Nb_2O_5$+$ZrO_2$<18 percent, with a range of 1 percent<$Nb_2O_5$+$ZrO_2$<16 percent being preferred.

Further, to achieve the desired objects of the present invention mentioned above, the total amount of $B_2O_3$, $SiO_2$, $La_2O_3$, $TiO_2$, ZnO, $Li_2O$, $WO_3$, $Nb_2O_5$, and $ZrO_2$ is higher than 95 percent, preferably 98 percent or more, more preferably 99 percent or more, and most preferably 100 percent. However, in addition to the above-stated components, $Sb_2O_3$ can be added in an external ratio of 0 to 2 percent, preferably 0 to 1 percent, and more preferably from greater than 0 percent to 1 percent or less. Additionally, commonly employed defoaming agents can be added in external ratios. However, in consideration of environmental effects, the addition of $As_2O_3$ is undesirable.

In addition to the above-listed components, small quantities of components such as $P_2O_5$, $Na_2O$, $K_2O$, CaO, SrO, BaO, and $Y_2O_3$ can be added to the optical glass of the present aspect within ranges that do not cause deterioration of the glass characteristics. For example, 0 to 5 percent (5 percent being excluded) of CaO and 0 to 5 percent (5 percent being excluded of $Y_2O_3$ can be incorporated. Further, although the incorporation of fluorine is possible, when preforms are being directly manufactured from melting glass, there is a risk of problems due to volatization. When volatization is a concern, it is desirable not to incorporate fluorine.

Further, from the perspective of environmental effects and the like, harmful substances such as lead compounds and cadmium compounds, as well as radioactive substances such as uranium and thorium should be excluded, in addition to excluding the above-described arsenic compounds.

Further, to achieve low cost in the optical glass of the present aspect, it is desirable not to incorporate $Ta_2O_5$. In the optical glass of the present aspect, even without incorporating $Ta_2O_5$, the use of the above-stated composition yields optical glass with a low Tg that is suited to precision pressing. The statement that $Ta_2O_5$ is not incorporated means that tantalum compounds are not employed as glass starting materials, but does not exclude the mixing in of such compounds as impurities.

In the first aspect of the present invention, the desirable composition is: 32 to 42 percent of $B_2O_3$, 3 to 12 percent of $SiO_2$, 11 to 18 percent of $La_2O_3$, 2 to 8 percent of $TiO_2$, 10 to 25 percent of ZnO, 3 to 12 percent of $Li_2O$, 0.1 to 10 percent of $WO_3$, 2 to 15 percent of $Nb_2O_5$, and 0 to 10 percent of $ZrO_2$. The preferred composition is: 32 to 42 percent of $B_2O_3$, 3 to 12 percent of $SiO_2$, 11 to 18 percent of $La_2O_3$, 2 to 8 percent of $TiO_2$, 12 to 22 percent of ZnO, 3 to 12 percent of $Li_2O$, 0.5 to 8 percent of $WO_3$, 2 to 15 percent of $Nb_2O_5$, and 0 to 8 percent of $ZrO_2$. And the composition of even greater preference is: 32 to 42 percent of $B_2O_3$, 3 to 12 percent of $SiO_2$, 11 to 18 percent of $La_2O_3$, 2 to 8 percent of $TiO_2$, 12 to 22 percent of ZnO, 3 to 12 percent of $Li_2O$, 0.5 to 8 percent of $WO_3$, 2 to 10 percent of $Nb_2O_5$, and 1 to 8 percent of $ZrO_2$.

The optical constants of the present aspect will be described next. The refractive index (nd) of the present aspect ranges from 1.75 to 1.87 and the Abbé number (vd) ranges from 30 to 45. To achieve glass with a low transition temperature, high light transmittance, hot molding properties, and high resistance to devitrification, the glass preferably exhibits optical constants of a refractive index (nd) of 1.76 to 1.87 and an Abbé number (vd) of 30 to 45, more preferably exhibits optical constants of a refractive index (nd) of 1.80 to 1.87 and an Abbé number (vd) of 30 to 45, further preferably exhibits optical constants of a refractive index (nd) of 1.80 to 1.87 and an Abbé number (vd) of 33 to 45, and particularly preferably exhibits optical constants of a refractive index (nd) of 1.81 to 1.86 and an Abbé number (vd) of 33 to 44.

The low-temperature softening property of the glass of the present aspect is characterized by the glass transition temperature (Tg). In the present aspect, the glass transition temperature (Tg) is 580° C. or less, preferably 570° C. or less. When the glass transition temperature (Tg) is within this range, it is possible to achieve good press molding properties, particularly precision press molding properties. Precision press molding is a method in which the shape the reverse of the molding surface of the pressing mold is precisely transferred to glass that is heated and softened to manufacture the targeted final glass product. The method of forming a glass optical element by precision press molding, also known as the mold optics molding method, permits the molding of an optical element without mechanical processing following the press molding of a surface (optically functional surface) imparted with an optical function that is used to transmit, reflect, refract, or diffract light. It is a method particularly suited to the molding of the aspherical surfaces of aspherical lenses. In precision press molding, during the repeated use of pressing molds, press molding must be conducted at a comparatively low temperature so as not to damage the molding surface of the mold. Thus, glass capable of being press molded at low temperature is suited to precision press molding.

The glass of the present aspect desirably has a good spectral transmittance characteristic. The spectral transmittance characteristic of glass can be evaluated based on the spectral transmittance of a sample of glass that is 10 mm thick with two polished parallel surfaces. The spectral transmittance is the transmittance of a glass sample including the surface reflection loss component; as is widely known, there is a prescribed relation to the thickness of the sample. Accordingly, measurement of the spectral transmittance need not necessarily be conducted for a thickness of 10 mm; it is possible to take an actually measured spectral transmittance and convert it to a value corresponding to a thickness of 10 mm using the above-mentioned known relation. With respect to the spectral transmittance characteristics, the glass of the present aspect exhibits properties, in the spectral transmittance of wavelengths of 280 to 700 nm, that the wavelength (λ80), at which a 80 percent spectral transmittance is exhibited, is 440 nm or less, and the wavelength (λ5), at which a 5 percent spectral transmittance is exhibited, is 350 nm or less. The optical glass exhibiting such spectral transmittance characteristics exhibits a spectral transmittance higher than 80 percent at a wavelength range of longer than λ80 and 700 nm or less. Further, as the wavelength increases from λ5 toward λ80, the spectral transmittance increases. Still further, as the wavelength decreases from λ5, the spectral transmittance decreases.

As described above, the optical glass of the present invention desirably has a high spectral transmittance over the entire visible wavelength range. Optical glass having such spectral transmittance characteristics develops little coloration and is colorless and transparent. It is suited to serving as the material of various optical elements, including those employed in imaging optical systems.

The glass of the present aspect is suited to precision press molding, as stated above. In precision press molding, to prevent oxidation of the molding surface of the mold and the mold separating film formed on the molding surface of the mold, the glass is often handled in a nonoxidizing atmosphere such as nitrogen or a mixed gas of nitrogen and hydrogen. The glass of the present aspect contains readily reduced metal oxide components such as $TiO_2$, $Nb_2O_5$, and $WO_3$. When such glass is heated in a nonoxidizing atmosphere, the above metals are reduced. As a result, absorption is sometimes manifested in the visible range, but the glass of the present aspect does not lose the above-stated spectral transmittance characteristics even after precision press molding. Accordingly, the spectral transmittance of precision press molded articles comprised of the glass of the present aspect is also extremely good when such articles are employed as optical elements.

The specific gravity of the glass of the present aspect will be described below. Although optical glass having the composition of the present aspect exhibits a high refractive index, the specific gravity is not so high. When the glass having a high specific gravity is employed, optical elements employing the glass, or optical devices, become heavy. For example, in camera lenses comprised of an assembly of multiple unit lenses and having an autofocusing function, the relative positioning of the unit lenses is driven and adjusted by an electronic drive system. In that process, when the unit lenses are heavy, autofocusing consumes a large amount of power and there is a problem in the form of severe battery consumption. Reducing the specific gravity of highly refractive lenses is one effective method of solving the above-stated problem. Accordingly, the optical glass of the present aspect, to be suitable as a starting material for optical elements, preferably has a specific gravity of 4.7 or less, more preferably 4.6 or less. Further, the specific gravity of the optical glass of the present aspect is suitably about 4 or more. The specific gravity of the glass of the present aspect can be reduced by incorporating ZnO and $Li_2O$. Further, incorporating these two components can lower the glass transition temperature (Tg) and improve the spectral transmittance (reduce coloration).

(The Second Aspect)

The second aspect of the present invention will be specifically described below.

The present aspect is optical glass comprising essential components of $B_2O_3$, $SiO_2$, $La_2O_3$, $TiO_2$, ZnO, $Li_2O$, and $WO_3$ and optional components of $Nb_2O_5$ and $ZrO_2$, wherein the total amount of the $B_2O_3$, $SiO_2$, $La_2O_3$, $TiO_2$, ZnO, $Li_2O$, $WO_3$, $Nb_2O_5$ and $ZrO_2$ is higher than 95 molar percent, the glass exhibits a refractive index (nd) in a range of from 1.75 to 1.87, and an Abbé number (vd) in a range of from 30 to 45, the glass exhibits properties, based on a thickness of 10 mm, in the spectral transmittance of wavelengths of 280 to 700 nm, that the wavelength, at which a 80 percent spectral transmittance is exhibited, is 440 nm or less, and the wavelength, at which a 5 percent spectral transmittance is exhibited, is 350 nm or less, and the glass exhibits a glass transition temperature (Tg) of 580° C. or less.

The composition of the present aspect will be described. By incorporating the above-mentioned essential components together into the glass of the present aspect as well as setting the total amount of the essential components and optional components mentioned above to higher than 95 molar percent, the desired optical constants are imparted, a low glass transition temperature is achieved, the spectral transmittance characteristics are improved, an increase in specific gravity is inhibited, and good resistance to devitrification, chemical stability and hot molding properties are imparted. From these perspectives, the incorporation of either $Nb_2O_5$ or $ZrO_2$ is preferable, and the incorporation of both $Nb_2O_5$ and $ZrO_2$ is more preferable. Further, the total amount of the above-listed essential components and optional components is preferably 98 percent or more, more preferably 99 percent or more, and particularly preferably 100 percent. However, in addition to the above-stated components, $Sb_2O_3$ can be added in an external ratio of 0 to 1.5 percent, preferably 0 to 1 percent, and more preferably greater than 0 percent to 1 percent or less. When $Sb_2O_3$ is added in large quantity, the molding surface of the pressing mold tends to be damaged during precision press molding. When denoted as a weight percent, the external ratio of $Sb_2O_3$ that is added is preferably 1.8 percent or less. Additionally, commonly employed defoaming agents can be added in external ratios. However, in consideration of environmental effects, the addition of $As_2O_3$ is undesirable. Further, in the optical glass of the present aspect, to achieve low cost, $Ta_2O_5$ is desirably not added. In the optical glass of the present aspect, even without incorporating $Ta_2O_5$, it is possible to achieve optical glass with a low Tg that is suited to precision pressing. The statement that $Ta_2O_5$ is not incorporated means that tantalum compounds are not employed as glass starting materials, but does not exclude the mixing in of such compounds as impurities.

In addition to the above-listed components, small quantities of components such as $P_2O_5$, $Na_2O$, $K_2O$, CaO, SrO, and BaO can be added to the optical glass of the present aspect within ranges that do not cause deterioration of the characteristics of the glass. Further, although the incorporation of fluorine is possible, when preforms are being directly manufactured from melting glass gobs, it is desirable not to incorporate fluorine from the perspective of avoiding deterioration due to volatization.

Further, from the perspective of environmental effects, harmful substances such as lead compounds and cadmium compounds, as well as radioactive substances such as uranium and thorium should be excluded, in addition to excluding the above-described arsenic compounds.

The preferable content of the various components in the optical glass of the present aspect is as indicated below (the contents being denoted as molar percents): 30 to 45 percent of $B_2O_3$, 2 to 15 percent of $SiO_2$, 10 to 20 percent of $La_2O_3$, 1 to 10 percent of $TiO_2$, 10 to 30 percent of ZnO, 2 to 15 percent of $Li_2O$, and higher than 0 percent and 10 percent or less of $WO_3$. Further, in a molar percent, it is desirable to incorporate 0 to 15 percent of $Nb_2O_5$ and 0 to 10 percent of $ZrO_2$.

The preferable ranges and reasons for the optical constants, glass transition temperature (Tg), spectral transmittance characteristics, specific gravity, and above-stated various characteristics of the present aspect are identical to those described for the first aspect.

Further, in the first and second aspects of the present invention, the yield point of the optical glass is preferably 580° C. or less. At 580° C. or less, problems such as foaming, cracking, and surface striae do not occur during press molding, yielding optical glass with good flatness and smoothness. Further, the liquid phase temperature of the optical glass of the first and second aspects of the present invention is preferably 1,000° C. or less. When the liquid phase temperature is 1,000° C. or less, it is easy to melt glass and handling properties are good.

(Precision Press Molding Preforms and Method of Manufacturing the Same)

A precision press molding preform of the present invention will be described below.

A press molding preform is a formed glass article that is to be heated, softened and press molded. It is comprised of glass having a desired weight corresponding to an article being press molded. The shape is one suited to press molding, examples of which are spherical, oblate spherical, and spheroid shapes.

Figure 2:
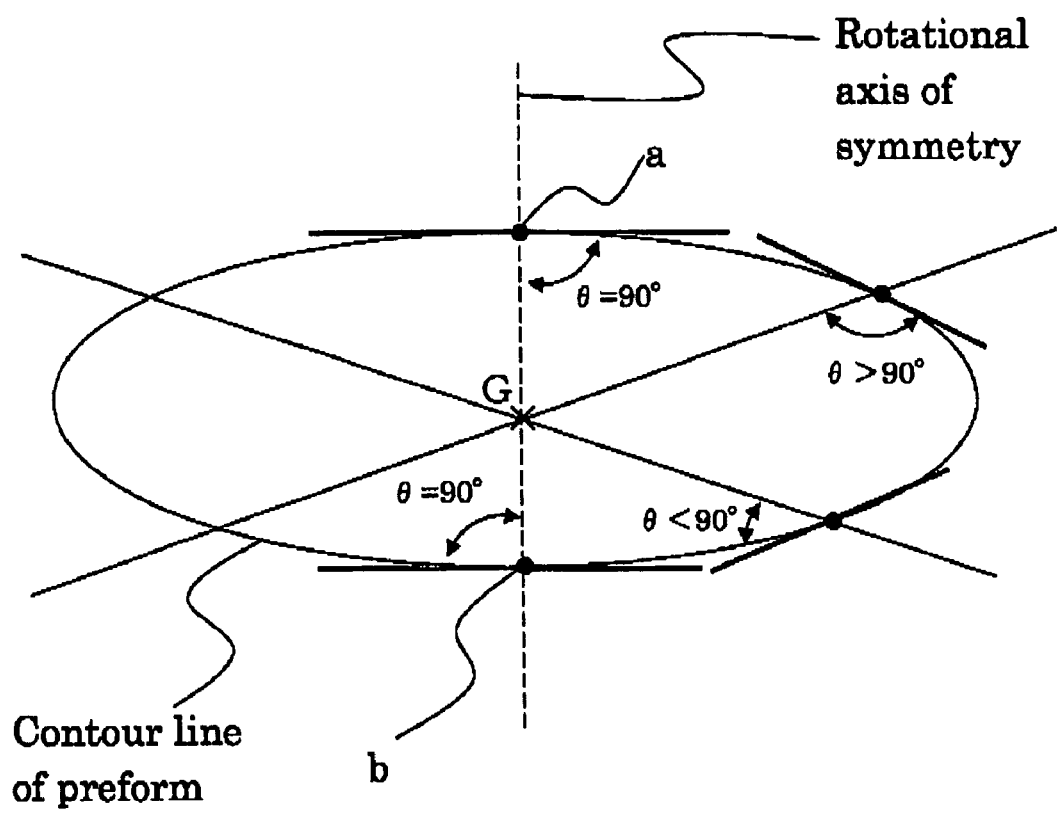
FIG. 2 is a schematic drawing of an example of the shape of the preform of the present invention.

The preferred shape has a rotational axis of symmetry, with a smooth contour line without angles or indentations in the cross-section containing the rotational axis of symmetry. One example is a shape having a contour line in the form of an ellipse in which the minor axis corresponds to the rotational axis of symmetry in the above-mentioned cross section. Further, the farther preferred shape is as shown in FIG. 2. In FIG. 2, the angle denoted as θ is one of the angles formed between the line connecting a point on the contour line of the preform in the above-mentioned cross-section with the center of gravity G of the preform on the rotational axis of symmetry and the tangent touching the contour line at a point on the above-mentioned contour line. In FIG. 2, when that point is moved from point a on the rotational axis of symmetry along the contour line, with θ increasing monotonically from 90°, decreasing monotonically, and then increasing monotonically, a 90° angle is armed at the other point b of intersection with the rotational axis of symmetry on the above-mentioned contour line. In any cross-section containing the above-mentioned rotational axis of symmetry, angle θ is desirable as set forth above.

The precision press molding preform of the present invention is comprised of the optical glass of the above-described first or second aspect. To enhance the mold separating effect and lubricating effect during press molding, a thin film such as a carbon film may be formed on the surface of the preform. The carbon film may be formed by vapor deposition or the like. Further, a hydrogenated carbon film may be formed by chemical vapor deposition. When forming a carbon-containing film on the surface of the preform in this manner, the film is desirably formed over the entire surface of the preform.

The press molding preform of the present invention that is comprised of the optical glass of the first or second aspect of the present invention is a precision press molding preform. This is because the glass comprising the above-described preform is an optical glass having a low softening property that does not lose its spectral transmittance characteristics during precision press molding. Here, the term "precision press molding," also known as the mold optics molding method as set forth above, is a method of forming the shape of an optically functional surface by press molding. The preform surface is desirably a free surface when directly forming a melting glass gob into a preform, described further below, and is desirably an optically polished surface when manufacturing by mechanical processing.

For example, the precision press molding preform of the present invention can be manufactured by the method of melting the glass starting materials, defoaming, clarifying, and homogenizing by stirring to prepare a homogenous melting glass containing no bubbles, and forming this melting glass into a preform; or by the method of forming the melting glass into a formed article for processing into preforms, and mechanically processing (for example, cutting, grinding, and polishing) the formed article into a preform. In particular, such a method is preferable in which a prescribed weight of melting glass is separated from a melting glass flow flowing out from an outflow pipe to form a preform For example, examples of such a method are a method in which the melting glass is continuously flowed out from a pipe at a constant speed as a melting glass flow, a prescribed weight of melting glass is separated from the front end of the melting glass flow and molded while still soft, and then cooled to obtain a preform; and a method in which the melting glass is continuously flowed out through a pipe at a constant speed, caused to drip in melting glass droplets of a prescribed weight from a pipe outlet, and the melting glass droplets are formed and cooled to obtain preforms. As mentioned above, the method of employing melting glass and forming a preform while the glass is still soft is called hot preform molding. Since both the glasses of the first and second aspects have low glass transition temperatures, and their viscosities during outflow can be adjusted to within the range suited to molding, preforms for press molding can be formed without causing the glass to devitrify. In hot molding, since the preform is formed from a target weight of melting glass, preforms of high weight precision can be produced without generating processing scars due to mechanical processing of the surface or the like.

Further, using the method of forming preforms by floating separated melting glass of a prescribed weight over a pressing mold or the like with air pressure and using the method of forming preforms by introducing melting glass droplets into a medium that has been liquefied by cooling with a substance that is gaseous under normal temperature and pressure, such as liquid nitrogen, it is possible to manufacture preforms with smooth surfaces free of scratches, contamination, and surface deformation, performs, the entire surface of which has been formed by solidifying melting glass as it is, and preforms, the entire surface of which is comprised of a free surface. In particular, the precision press molding preform of the present invention preferably has an entire surface that is comprised of a free surface formed by solidifying melting glass as it is.

While the phrase "the entire surface has been formed by solidifying melting glass as it is" includes the case where there are spots to which the mold surface has been transferred by contact with the mold used for molding, the phrase "the entire surface is comprised of a free surface" means that there are not spots where the mold surface has been transferred by contact with the mold.

In precision press molding, the surface of the preform often remains as the optical element surface in the final product. Thus, the presence of processing scare creates the risk of defects close to the optical element surface. However, since preforms without defects in the vicinity of the surface can be manufactured by hot preform molding, high-quality optical elements with good production properties can be provided by precision press molding.

Each of the above-mentioned performs preferably has a weight of 40 mg to 10 g. Furthermore, spherical performs preferably have a weight of 40 mg to 700 mg, more preferably 100 mg to 400 mg. Preforms having one rotational axis of symmetry preferably have a weight of 300 mg to 10 g.

(Optical Element and Method of Manufacturing Same)

The optical element of the present invention is comprised of the optical glass of the first or second aspect, or is obtained by precision press molding the above-described precision press molding preform. Examples of the optical element are: lenses (aspherical lenses, spherical lenses, cylindrical lenses, rod-shaped lenses, and the like), lens arrays, prisms, diffraction gratings, and various optical substrates. Optical thin films such as antireflective films, partially reflective films, and fully reflective films may be formed on the optical element.

The method of manufacturing the optical element of the present invention will be described below. In this manufacturing method, the above-described precision press molding preform is heated, softened, and precision press molded to manufacture a glass optical element. FIG. 1 is a descriptive drawing of this manufacturing method. Since the optical functional surfaces of optical elements that are quite burdensome to produce by mechanical processing, such as aspherical lenses and diffraction gratings, can be formed by precision press molding, optical elements that are difficult to produce by mechanical processing can be mass produced with good production properties. Known methods may be employed for precision press molding and the heating and softening of preforms. The spectral transmittance characteristics, shape precision and the like of the optical elements obtained are good.

The optical element of the present invention can be manufactured by a manufacturing method in which the heating of the precision press molding preform is conducted by introducing the precision press molding preform into a pressing mold and then heating the preform together with the pressing mold. In this method, the precision press molding preform may be preheated prior to being introduced into the press mold.

In this manufacturing method, the temperature, to which the precision press molding preform and the pressing mold are heated together following introducing the preform into the pressing mold, is preferably a temperature at which the glass constituting the preform exhibits a viscosity of $10^6$ to $10^{12}$ dPaS. After cooling to a temperature at which the glass exhibits a viscosity of $10^{12}$ dPaS or higher, preferably $10^{14}$ dPaS or higher, and more preferably $10^{16}$ dPaS or higher, the precision press-molded article is preferably removed from the pressing mold. By the conditions mentioned above, the shape of the molding surface of the pressing mold can be more precisely transferred to the glass, and the precision press-molded article can be removed without deformation.

In the above-described manufacturing method, the precision press molding preform can be preheated prior to being introduced into the pressing mold to shorten the cycle time and manufacture an optical element of good spice precision without surface defects.

The temperature, to which the precision press molding preform and the pressing mold are heated together following introducing the preform into the pressing mold, is preferably a temperature lower than the temperature of preheating the preform. By preheating the preform prior to introduction into the pressing mold in this manner, wear and tear on the pressing mold can be reduced because the temperature to which the precision press molding preform and the pressing mold are heated together following introducing the preform into the pressing mold can be kept low.

The above-described preform preheating temperature is desirably a temperature at which the glass constituting the preform exhibits a viscosity of $10^9$ dPaS or less, preferably $10^9$ dPaS. Preheating the preform while floating it is desirable, preheating to a temperature at which the glass constituting the preform exhibits a viscosity of $10^{5.5}$ to $10^9$ dPaS is preferable, and preheating to a temperature $10^{5.5}$ dPaS or higher and less than $10^9$ dPaS is more preferable. Cooling of the glass is desirably started simultaneously with the start of pressing, or during the course of pressing. As set forth above, the temperature, to which the precision press molding preform and the pressing mold are heated together following introducing the preform into the pressing mold, is preferably a temperature lower than the temperature of preheating the preform. In this process, the temperature to which the preform and the pressing mold are heated together can be a temperature at which the glass constituting the preform exhibits a viscosity of $10^9$ to $10^{12}$ dPaS. In the present method, following press molding, separation from the mold is desirably conducted after cooling to a temperature at which the viscosity of the glass is $10^{12}$ dPaS or higher.

The optical element formed by precision press molding is removed from the pressing mold and gradually cooled as needed. When the formed article is an optical element such as a lens, the surface may be coated as needed with an optical thin film.

Lenses (aspherical lenses, spherical lenses, cylindrical lenses, rod-shaped lenses, and the like), lens arrays, prisms, diffraction gratings, and various optical substrates can be manufactured in this manner. In addition, various lenses having different shapes can be manufactured, such as a convex meniscus lens, a concave meniscus lens, a lens both surfaces of which are a convex, a lens both surfaces of which are a concave, a lens one surface of which is a flat surface and the other surface of which is a convex, and a lens one surface of which is a flat surface and the other surface of which is a concave.

EXAMPLES

Examples of the present invention will be specifically described below. However, the present invention is not limited to these Examples.

Examples 1–32

250 to 300 g of various corresponding oxides, carbonates, sulfates, nitrates, fluorides, hydroxides, and the like were weighed out in prescribed proportions as starting materials for glass components such as $B_2O_3$, $SiO_2$, $La_2O_3$, $TiO_2$, ZnO, $Li_2O$, $WO_3$, $Nb_2O_5$, $ZrO_2$, $Y_{2O3}$, and CaO to yield the compositions indicated in Table 1, the components were thoroughly mixed to obtain batches, the batches were placed in platinum crucibles, and the components were stirred in air at 1,200 to 1,250° C. for 2 to 4 hours to obtain melting glass. Following melting, the melting glass was poured into a carbon mold measuring 40×70×15 mm, cooled to the glass transition temperature, and immediately placed in an annealing furnace. The glass was annealed for about 1 hour within the transition temperature range, and then allowed to cool to room temperature in the furnace. Crystals observable by microscope did not precipitate in the glass obtained.

In addition to the above-mentioned glass compositions, Table 1 gives the optical constants (refractive index nd, Abbé number vd), glass transition temperature (Tg), specific gravity, λ80 and λ5 measured for each of the glasses. The refractive index (nd), Abbé number (vd), glass transition temperature (Tg), specific gravity, λ80, and λ5 were measured as follows.

(1) Refractive Index (nd) and Abbé Number (vd)

These were measured for optical glass obtained at a gradual cooling temperature drop rate of −30° C./h.

(2) Glass Transition Temperature (Tg)

This was measured with a thermomechanical analyzer made by Rigaku Denki K.K at a heating rate of 4° C./min.

(3) Spectral Transmittance (λ80, λ5)

The spectral transmittance (including surface reflection loss) of glass that had been polished to a thickness of 10±0.1 mm was measured over a wavelength range of 280 to 700 nm. As regards coloration, the wavelengths at which transmittances of 80 percent and 5 percent were exhibited were denoted as λ80 and λ5, respectively. λ80 and λ5 were determined to two significant digits.

(4) Specific Gravity

The specific gravity was measured by Archimedes' method.

TABLE 1

| Ex. | $B_2O_3$ | $SiO_2$ | $La_2O_3$ | $TiO_2$ | ZnO | $Li_2O$ | $WO_3$ | $Mo_2O_3$ | $ZrO_2$ | $Y_2O_3$ | CaO |
|---|---|---|---|---|---|---|---|---|---|---|---|
| 1 | 38.67 | 6.61 | 16.53 | 4.96 | 13.22 | 6.61 | 4.96 | 2.46 | 4.96 | 0.00 | 0.00 |
| 2 | 37.39 | 9.78 | 16.26 | 4.88 | 13.01 | 6.50 | 4.88 | 2.44 | 4.88 | 0.00 | 0.00 |
| 3 | 38.37 | 6.61 | 16.52 | 4.96 | 13.22 | 9.92 | 4.86 | 2.48 | 4.96 | 0.00 | 0.00 |
| 4 | 25.20 | 12.80 | 16.00 | 4.80 | 12.80 | 6.40 | 4.80 | 2.40 | 4.80 | 0.00 | 0.00 |
| 5 | 33.05 | 15.75 | 15.75 | 4.72 | 12.60 | 6.30 | 4.75 | 2.36 | 4.72 | 0.00 | 0.00 |
| 6 | 31.02 | 18.80 | 15.50 | 4.65 | 12.40 | 6.20 | 4.65 | 2.33 | 4.55 | 0.00 | 0.00 |
| 7 | 38.03 | 8.50 | 14.63 | 8.13 | 13.01 | 6.50 | 4.86 | 2.44 | 4.68 | 0.00 | 0.00 |
| 8 | 39.67 | 8.61 | 14.88 | 4.96 | 13.22 | 6.61 | 4.96 | 4.13 | 4.96 | 0.00 | 0.00 |
| 9 | 39.67 | 8.61 | 13.22 | 4.96 | 13.22 | 6.61 | 4.96 | 5.78 | 4.96 | 0.00 | 0.00 |
| 10 | 39.67 | 8.61 | 11.57 | 4.96 | 13.22 | 6.61 | 4.96 | 7.44 | 4.96 | 0.00 | 0.00 |
| 11 | 39.03 | 8.50 | 14.83 | 4.88 | 13.01 | 8.50 | 8.13 | 2.44 | 4.88 | 0.00 | 0.00 |
| 12 | 38.40 | 8.40 | 12.80 | 4.80 | 12.80 | 6.40 | 11.20 | 2.40 | 4.60 | 0.00 | 0.00 |
| 13 | 40.17 | 6.68 | 16.74 | 5.02 | 13.39 | 6.49 | 2.61 | 3.77 | 5.02 | 0.00 | 0.00 |
| 14 | 39.18 | 6.53 | 18.33 | 7.35 | 13.08 | 6.53 | 4.90 | 1.22 | 4.90 | 0.00 | 0.00 |
| 15 | 38.71 | 6.45 | 18.13 | 9.68 | 12.90 | 6.45 | 4.84 | 0.00 | 4.84 | 0.00 | 0.00 |
| 16 | 39.67 | 6.61 | 18.53 | 9.92 | 13.22 | 6.61 | 4.96 | 2.48 | 0.00 | 0.00 | 0.00 |
| 17 | 40.60 | 6.78 | 16.95 | 5.06 | 13.58 | 8.78 | 5.08 | 5.08 | 0.00 | 0.00 | 0.00 |
| 18 | 39.67 | 6.61 | 18.53 | 4.96 | 13.22 | 8.61 | 9.92 | 2.48 | 0.00 | 0.00 | 0.00 |
| 19 | 39.34 | 6.56 | 18.39 | 6.56 | 13.11 | 6.56 | 8.58 | 1.64 | 3.28 | 0.00 | 0.00 |
| 20 | 39.67 | 6.61 | 14.88 | 4.96 | 13.22 | 6.61 | 4.96 | 2.48 | 4.96 | 1.65 | 0.00 |
| 21 | 39.67 | 6.61 | 18.22 | 4.96 | 13.22 | 6.61 | 4.96 | 2.48 | 4.96 | 3.31 | 0.00 |
| 22 | 39.68 | 8.61 | 11.57 | 4.96 | 13.22 | 8.81 | 4.98 | 2.47 | 4.96 | 4.98 | 0.00 |
| 23 | 38.80 | 8.40 | 14.40 | 4.80 | 19.20 | 4.80 | 4.80 | 4.00 | 4.80 | 0.00 | 0.00 |
| 24 | 38.80 | 8.40 | 14.40 | 4.80 | 22.40 | 4.80 | 1.60 | 4.00 | 4.80 | 0.00 | 0.00 |
| 25 | 37.60 | 8.40 | 13.60 | 4.80 | 22.40 | 4.80 | 1.60 | 4.00 | 4.80 | 0.00 | 0.00 |
| 26 | 38.80 | 8.40 | 14.40 | 1.60 | 22.40 | 4.80 | 4.80 | 4.00 | 4.80 | 0.00 | 0.00 |
| 27 | 38.52 | 7.94 | 13.49 | 4.76 | 20.63 | 4.78 | 3.17 | 3.97 | 4.76 | 0.00 | 0.00 |
| 28 | 38.91 | 8.48 | 14.36 | 4.67 | 19.46 | 4.87 | 2.11 | 4.06 | 4.87 | 0.00 | 0.00 |
| 29 | 37.91 | 8.06 | 14.52 | 4.84 | 19.35 | 4.84 | 1.61 | 4.03 | 4.84 | 0.00 | 0.00 |
| 30 | 37.80 | 5.40 | 13.00 | 4.80 | 19.20 | 4.80 | 1.60 | 4.00 | 4.80 | 0.00 | 3.20 |
| 31 | 38.81 | 6.48 | 14.28 | 4.86 | 19.45 | 4.81 | 2.27 | 4.05 | 4.86 | 0.00 | 0.00 |
| 32 | 39.81 | 3.25 | 13.82 | 4.88 | 22.78 | 4.88 | 1.83 | 4.07 | 4.88 | 0.00 | 0.00 |

| Ex. | Total | nd | γd | Tg (° C.) | λ 80 (nm) | λ 5 (nm) | Specific gravity |
|---|---|---|---|---|---|---|---|
| 1 | 100.00 | 1.83458 | 37.88 | 553 | 430 | 350 | 4.504 |
| 2 | 100.00 | 1.83081 | 38.06 | 550 | 430 | 350 | 4.479 |
| 3 | 100.00 | 1.83878 | 37.66 | 534 | 420 | 340 | 4.487 |
| 4 | 100.00 | 1.82730 | 38.12 | 557 | 430 | 350 | 4.702 |
| 5 | 100.00 | 1.82336 | 38.24 | 559 | 430 | 350 | 4.438 |
| 6 | 100.00 | 1.81871 | 38.34 | 562 | 430 | 350 | 4.422 |
| 7 | 100.00 | 1.84115 | 35.76 | 553 | 440 | 350 | 4.403 |
| 8 | 100.00 | 1.84027 | 36.31 | 548 | 430 | 350 | 4.433 |
| 9 | 100.00 | 1.84649 | 34.64 | 547 | 430 | 350 | 4.436 |
| 10 | 100.00 | 1.85216 | 33.03 | 544 | 440 | 350 | 4.282 |
| 11 | 100.00 | 1.83520 | 36.34 | 547 | 430 | 350 | 4.515 |
| 12 | 100.00 | 1.83390 | 35.10 | 543 | 440 | 350 | 4.588 |
| 13 | 100.00 | 1.83755 | 37.63 | 551 | 420 | 350 | 4.430 |
| 14 | 100.00 | 1.83440 | 37.82 | 548 | 430 | 350 | 4.470 |
| 15 | 100.00 | 1.83433 | 37.48 | 548 | 430 | 350 | 4.451 |
| 16 | 100.00 | 1.84047 | 35.55 | 546 | 430 | 350 | 4.419 |
| 17 | 100.00 | 1.84028 | 35.14 | 548 | 430 | 350 | 4.466 |
| 18 | 100.00 | 1.83242 | 36.46 | 544 | 440 | 350 | 4.583 |
| 19 | 100.00 | 1.82499 | 37.52 | 543 | 430 | 350 | 4.488 |
| 20 | 100.00 | 1.83071 | 39.09 | 551 | 420 | 350 | 4.449 |
| 21 | 100.00 | 1.82743 | 38.15 | 554 | 420 | 350 | 4.413 |
| 22 | 100.00 | 1.82299 | 38.25 | 558 | 410 | 350 | 4.358 |
| 23 | 100.00 | 1.84985 | 35.82 | 554 | 440 | 350 | 4.533 |
| 24 | 100.00 | 1.84053 | 37.32 | 541 | 420 | 350 | 4.448 |
| 25 | 100.00 | 1.83360 | 37.24 | 548 | 420 | 350 | 4.390 |
| 26 | 100.00 | 1.83455 | 37.81 | 542 | 410 | 340 | 4.548 |

TABLE 1-continued

| 27 | 100.00 | 1.83580 | 36.64 | 546 | 430 | 350 | 4.405 |
| 28 | 100.00 | 1.83384 | 37.18 | 547 | 430 | 350 | 4.378 |
| 29 | 100.00 | 1.83146 | 37.47 | 548 | 430 | 350 | 4.300 |
| 30 | 100.00 | 1.83250 | 37.80 | 547 | 410 | 340 | 4.361 |
| 31 | 100.00 | 1.83644 | 36.97 | 552 | 420 | 350 | 4.412 |
| 32 | 100.00 | 1.83557 | 36.53 | 531 | 420 | 350 | 4.414 |

Example 33

Melting glass of the same composition as the glasses of Examples 1–32 being defoamed, clarified, and homogenized was prepared. The melting glass was continuously passed through a heat-resistant pipe made of platinum alloy at a constant flow rate, and made to drip from the end into receiving molds. Air pressure was applied with gas released by the receiving molds, forming spherical preforms while floating the droplets. The melting glass droplets flowing out from the end of the pipe were made to successively fall at constant intervals, and were sequentially received by multiple receiving molds and formed. In this manner, spherical preforms of desired weight and comprised of glasses corresponding to Examples 1 to 32 were manufactured.

Similarly, the above melting glass flow was made to continuously flow out of the outflow pipe at a constant speed, the front end of the melting glass flow was received by a receiving mold, a constriction was formed in the melting glass flow between the front end and the outflow pipe, the receiving mold was withdrawn from the pipe, and the front end of the melting glass flow was separated from the constriction. The melting glass gob that had been separated was then formed into a spherical preform while being floated by the same method as set forth above. The method of preparing multiple receiving molds and sequentially employing the receiving molds to mold large quantities of preforms from the melting glass continuously flowing out was identical to the above-described method.

By this method, it was possible to manufacture spherical preforms from 2 to 30 mm in diameter. The weight of these preforms was uniform and they had good interior portions and outer surfaces. Further, the entire surface of each of the above-described preforms was formed by solidifying the melting glass, was both clean and smooth, and comprised of a free surface. No defects such as scratches, devitrification, or striae were observed on any part of the preform surface.

Thus, the above-described method was found to be suitable as a method of manufacturing precision press molding preforms.

Example 34

Next, the press molding preform manufactured in Example 33 was heated, softened, and precision press molded with the pressing device shown in FIG. 1 to obtain an aspherical lens. Specifically, the preform was placed between a lower mold 2 and an upper mold 1 that had aspherical surface shapes being reverse to a lens shape, the interior of a silica tube 11 was backfilled with a nitrogen atmosphere, power was supplied to a heater 12, and the interior of silica tube 11 was heated. The temperature within the pressing mold was set 50 to 100° C. higher than the glass transition temperature (Tg), and while maintaining the temperature, pressing rod 13 was dropped to press against upper mold 1, press molding the preform in the pressing mold. The pressing conditions were a molding pressure of 8 MPa and a molding time of 30 sec. Following pressing, the mold pressure was decreased, the glass article that had been press molded was gradually cooled to a temperature about 30° C. lower than the glass transition temperature (Tg) while still in contact with lower mold 2 and upper mold 1, and the glass that had been formed into an asymmetrical lens was then rapidly cooled and removed from the pressing mold. The aspherical lens obtained was of extremely high precision and had good spectral transmittance characteristics.

The above-described precision press molding was conducted after the preform had been introduced into the pressing mold and the preform and pressing mold had been heated together. However, the preform may be preheated prior to introduction into the pressing mold.

The present invention provides optical glass with a good low-temperature softening property and good optical characteristics without the introduction of expensive tantalum. The present invention also provides a precision press molding preform comprised of the optical glass, a method of manufacturing such preform, an optical element comprised of such optical glass, and a method of manufacturing such an optical element.

The present invention provides an optical glass having the optical constants of a refractive index (nd) of 1.75 to 1.87 and an Abbé number (vd) of 30 to 45, and a low glass transition temperature of 580° C. or less, even without the incorporation of $Ta_2O_5$. Since the optical glass of the present invention employs absolutely no expensive tantalum, it is possible to stably provide at low cost an optical glass having the optical constants of a refractive index (nd) of 1.75 to 1.87 and an Abbé number (vd) of 30 to 45, with a low glass transition temperature of 580° C. or less. Further, it is possible to provide an optical glass with good spectral transmittance characteristics while retaining the stated optical constants. Still further, it is possible to provide a glass material for controlled-weight optical elements because the above-listed optical constants are imparted while suppressing an increase in the specific gravity.

Further, the precision press molding preform and manufacturing method of the same of the present invention provide both a preform for the manufacturing by press molding of optical elements having the above-stated optical constants, and a method of manufacturing the same. Further, inexpensive preforms can be stably provided because no expensive tantalum is incorporated.

Still further, the optical element and manufacturing method of the same of the present invention provide both an optical element having good spectral transmittance characteristics while retaining the characteristics and advantages of the above-described optical glass and preform, and a manufacturing method of such an optical element. Further, inexpensive optical elements can be stably provided because a glass material not comprising tantalum is employed.

The present disclosure relates to the subject matter contained in Japanese Patent Application No. 2002-238909 filed on Aug. 20, 2002, which is expressly incorporated herein by reference in its entirety.

What is claimed is:

1. Optical glass comprising, in a molar percent,
30 to 45 percent of $B_2O_3$,
2 to 15 percent of $SiO_2$,
10 to 20 percent of $La_2O_3$,
1 to 10 percent of $TiO_2$,
10 to 30 percent of ZnO,
2 to 15 percent of $Li_2O$,
higher than 0 percent and 10 percent or less of $WO_3$,
0 to 15 percent of $Nb_2O_5$, and
0 to 10 percent of $ZrO_2$,
wherein the total amount of the $B_2O_3$, $SiO_2$, $La_2O_3$, $TiO_2$, ZnO, $Li_2O$, $WO_3$, $Nb_2O_5$ and $ZrO_2$ is higher than 95 percent, and the glass exhibits a refractive index (nd) in a range of 1.75 to 1.87 and an Abbé number (vd) in a range of 30 to 45 wherein the glass contains no $Ta_2O_5$.

2. The optical glass according to claim 1, wherein the glass exhibits a transition temperature (Tg) of 580° C. or less.

3. Optical glass comprising essential components of $B_2O_3$, $SiO_2$, $La_2O_3$, $TiO_2$, ZnO, $Li_2O$, and $WO_3$ and optional components of $Nb_2O_5$ and $ZrO_2$,
wherein the total amount of the $B_2O_3$, $SiO_2$, $La_2O_3$, $TiO_2$, ZnO, $Li_2O$, and $WO_3$ $Nb_2O_5$ and $ZrO_2$ is higher than 95 molar percent,
the glass exhibits a refractive index (nd) in a range of 1.75 to 1.87, and an Abbé number (vd) in a range of 30 to 45,
the glass exhibits properties, based on a thickness of 10 mm, in the spectral transmittance of wavelengths of 280 to 700 nm, that the wavelength, at which a 80 percent spectral transmittance is exhibited, is 440 nm or less, and the wavelength, at which a 5 percent spectral transmittance is exhibited, is 350 nm or less, and
the glass exhibits a glass transition temperature (Tg) of 580° C. or less.

4. A precision press molding preform comprised of the optical glass according to claim 1.

5. A precision press molding preform comprised of the optical glass according to claim 2.

6. A precision press molding preform comprised of the optical glass according to claim 3.

7. The precision press molding preform according to claim 4, wherein an entire outer surface of the preform comprises solidified melting glass.

8. The precision press molding preform according to claim 5, wherein an entire outer surface of the preform comprises solidified melting glass.

9. The precision press molding preform according to claim 6, wherein an entire outer surface of the preform comprises solidified melting glass.

10. The precision press molding preform according to claim 4, wherein an entire outer surface of the preform is comprised of a free surface.

11. The precision press molding preform according to claim 5, wherein an entire outer surface of the preform is comprised of a free surface.

12. The precision press molding preform according to claim 6, wherein an entire outer surface of the preform is comprised of a free surface.

13. An optical element comprised of the optical glass according to claim 1.

14. An optical element comprised of the optical glass according to claim 2.

15. An optical element comprised of the optical glass according to claim 3.

16. An optical element obtained by precision press molding the precision press molding preform according to claim 4.

17. An optical element obtained by precision press molding the precision press molding preform according to claim 5.

18. An optical element obtained by precision press molding the precision press molding preform according to claim 6.

19. An optical element obtained by precision press molding the precision press molding preform according to claim 7.

20. An optical element obtained by precision press molding the precision press molding preform according to claim 8.

21. An optical element obtained by precision press molding the precision press molding preform according to claim 9.

22. An optical element obtained by precision press molding the precision press molding preform according to claim 10.

23. An optical element obtained by precision press molding the precision press molding preform according to claim 11.

24. An optical element comprising obtained by precision press molding the precision press molding preform according to claim 12.

25. An optical element comprising a precision press molded preform having a prescribed weight of an optical glass as defined in claim 1 and a shape defined by a separated melting glass flowing out from an outflow pipe.

26. An optical element comprising a precision press molded preform having a prescribed weight of an optical glass as defined in claim 2 and a shape defined by a separated melting glass flowing out from an outflow pipe.

27. An optical element comprising a precision press molded preform having a prescribed weight of an optical glass as defined in claim 3 and a shape defined by a separated melting glass flowing out from an outflow pipe.

* * * * *